Dec. 4, 1923.

F. W. SHOLES 1,476,425

PHOTOPRINT WASHING MACHINE

Filed April 29, 1922

Inventor:
Frank W. Sholes.

Patented Dec. 4, 1923.

1,476,425

UNITED STATES PATENT OFFICE.

FRANK W. SHOLES, OF PORTLAND, MAINE.

PHOTOPRINT WASHING MACHINE.

Application filed April 29, 1922. Serial No. 557,306.

*To all whom it may concern:*

Be it known that I, FRANK W. SHOLES, a citizen of the United States, residing at Portland, in the county of Cumberland and State of Maine, have invented a new Photoprint-Washing Machine, of which the following is a specification.

My invention relates to improvements in a machine for thoroughly washing photoprints or films and removing all trace of the chemicals with which they have been treated and from which it is very essential they should be free before they are continually exposed to the light.

With many of the washing machines now on the market the difficulty of separating the prints, and keeping them separated, while being washed, has not been overcome. If two or more prints cleave to each other while in the washing tank a thorough and proper washing and cleaning of the pieces cannot be effected, and a print which will fade and be very inferior will result.

In my machine I have succeeded in accomplishing my object, which is to thoroughly wash the prints by keeping them apart, by creating a counter-current in the tank which will not allow the prints to become massed or banked together for any appreciable length of time and by keeping up a constant agitation but without the agitating agent coming into direct contact with the prints,—providing thereby a safe, sure and simple process and one in which the element of time-saving is a predominating feature.

Figure 1:
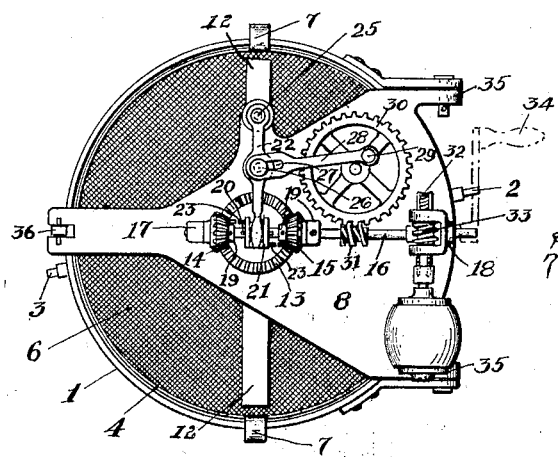
Figure 2:
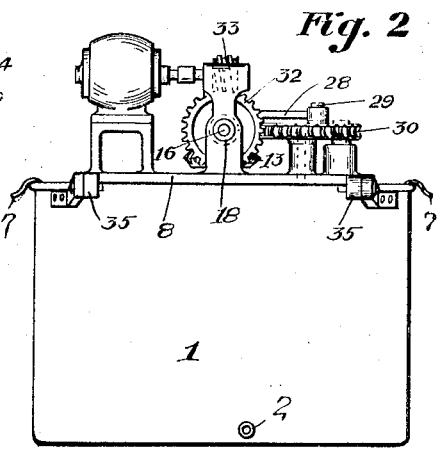
Figure 3:
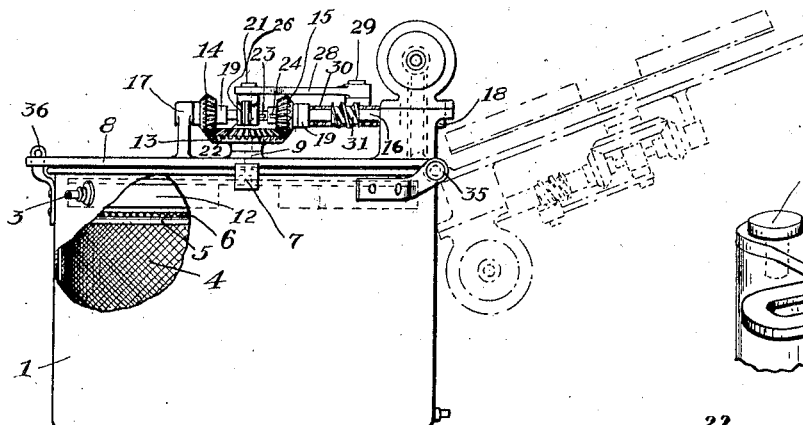
Figure 4:
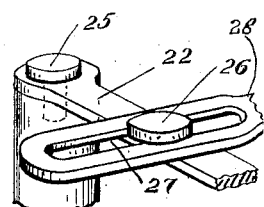
Figure 5:
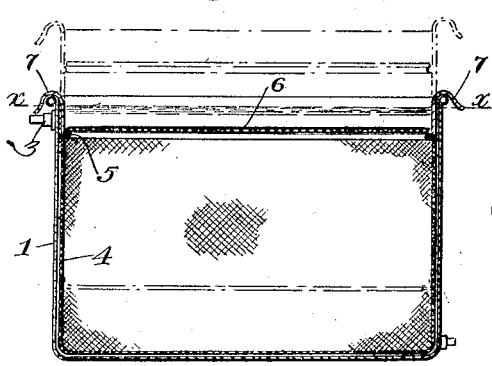
Figure 6:
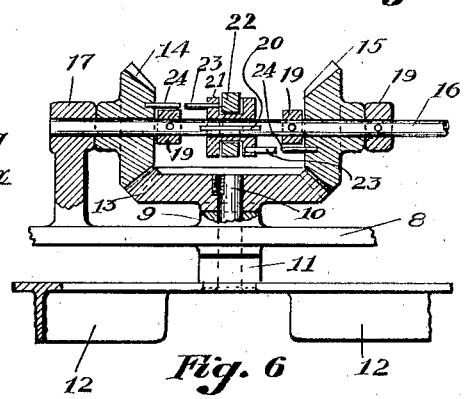

In the drawing accompanying this specification Fig. 1 is a view of washing machine complete, shown in plan; Fig. 2 is an end view of same; Fig. 3 is a side view with a part of tank broken out, showing part section of interior, and also showing in dot-and-dash lines the whole actuating mechanism swung out of operating position; Fig. 4 is a detail, enlarged, of slotted connecting-rod and clutch lever; Fig. 5 is a central vertical sectional view of tank, basket and screen partition, and Fig. 6 is an enlarged view, partly in section, of the reverse mechanism, and showing paddles, the section being taken on line 1—1, Fig. 1.

Similar numerals refer to similar parts throughout the several views.

Referring to Figs. 1, 3 and 5, 1 is a water tank, with inlet at 2 and outlet at 3,—water line being shown on line *x-x*, Fig. 5. Within tank 1 is a basket shaped container 4 with open top, and with sides up to ledge 5, and bottom, made of wire screen or perforated metal. Above ledge 5 I make the basket of sheet metal. Resting on ledge 5 is a screen cloth cover or partition 6, permitting an easy flow of water through same. Handles 7, 7 permit of handling basket in and out of tank easily.

On the extreme top of tank 1 is frame 8 and centrally located in bearing 9 is shaft 10, on the bottom end of which is secured hub 11, to which are fastened blades or paddles 12 (in this case made integral). I have shown in the drawing two blades but I may use one or more successfully. These blades I have made T shape, and have cut out a portion of the vertical leg about the turning axis, as I have found it assists the downward tendency of the water at the time of reversing the direction of movement of the blades.

Above bearing 9, shaft 10 is secured to gear 13, on opposite sides of which gear are pinions 14 and 15 respectively. Referring to Fig. 6 it will be seen that these two pinions, 14 and 15, are loosely mounted on horizontal shaft 16, running in bearings 17, Fig. 6, and 18 Figs. 1 and 2. Collars 19, 19 hold these pinions in place. Slidably keyed to shaft 16, by means of feather 20, is a clutch collar 21, operated by clutch lever 22. On each face of this collar 21 is a clutch pin 23, adapted to engage, at the proper time, a similar pin 24, projecting out of a side of one of the pinions 14 and 15. Clutch lever 22 is pivoted at 25, and at 26 is a stud pin travelling in slot 27, in connecting rod 28.

Opposite the slotted end, connecting rod 28 is pivoted about crank pin 29 on worm gear 30. Driving worm gear 30 is worm 31, rigidly secured to shaft 16. Also secured to shaft 16 is worm gear 32, driven by worm 33 which is rigidly attached to motor shaft by a sliding keyed collar. I have also provided means for operating the washer by hand power, using the hand wheel, shown in dot-and-dash lines, 34. In driving machine with this latter power I, of course, disengage the worm 33 from worm gear 32. Frame 8 is suitably hinged at 35, 35, and furnished with a clamp fastening at 36.

After a batch of prints have been washed this frame, together with everything mounted thereon, can be swung out of operating position on tank into position shown in dot-and-dash lines Fig. 3. While in this position, screen basket 4 can be elevated and lifted out of tank, using handles 7, 7, and with it will come all the prints just washed. Screen partition 6 may be lifted off ledge 5 and provision for easy access to prints made.

Having described the mechanical details of my washer a brief description of its operation will be in order. Having deposited the prints required to be washed, in the basket, it is lowered into tank, frame is swung into operating position and locked, and machine started. Shaft 16 in direct connection with motor or hand lever will drive clutch collar 21 continuously; it will also drive worm gear 30. Now as crank-pin 28 travels in its path around gear center 37 the pin 26 will bring up alternately in either end of slot 27. In doing so it will cause lever 22, to move clutch collar 21, up against pinion 14 or pinion 15, engaging one of the pins 23 with its corresponding pin 24.

In returning, the connecting-rod 28 travels the full length of slot 27, plus the length of pin 23, before movement of gear 13 is brought to a dead stop by the disengagement of pins 23 and 24. At this point in the operation the paddles or blades 12, 12, being connected through shaft 10 to gear 13 also become motionless,—but this is but for an instant, for as the rod 28 continues its movement forward pushing the clutch collar 21 along shaft 16 the opposite set of pins are brought into engagement, connecting with opposite pinion, which reverses the direction of movement of blades.

It is quite obvious then that the paddles are in motion practically all of the time, either in one direction or the opposite,—the only exception being for the instant when the pins on one side of the clutch collar slip out of engagement and the opposite set slip into engagement with their respective pinions.

During this time of engagement of either set of pins the paddles will be churning the water, and although they are submerged but a short distance from its surface the action is sufficient to communicate the movement, as for instance clock-wise, to all parts of the water in the tank, even to the bottom. But at the instant of reversing, or when the opposite set of pins engage, the movement of the paddles will set up a current, as for instance, counter-clock-wise, to the water immediately in contact with the paddles, and this upper stratum of water meeting the lower strata, which as yet has not changed its direction of movement, will cause a downward current to develop.

In this current the prints, which previously have risen toward the screen partition 6, will be carried downward and will remain some distance below the screen partition until finally the lower stratum or portion of water will take on the direction of the upper stratum, which is being driven by the paddles, and the prints will gradually assume an upward movement. It will be appreciated that this continual upward and downward movement of the prints tends to keep them thoroughly separated, and this is accomplished with no possibility of their being injured by coming in contact with any moving agent, except the water, as no prints can rise above the screen partition 6, above which all mechanical stirring of the water takes place.

Having thus described my invention, I claim:

1. In a photo-print washing machine, the combination of a water tank, means for admitting water into said tank near the bottom thereof, means for discharging water from said tank near the top thereof, a frame member mounted on the top of said tank, a vertical oscillating shaft mounted in a bearing in said frame member, paddles fixed to the lower end of said oscillating shaft and placed so as to revolve in the water in the upper portion of said tank, means for actuating said vertical shaft rotatably, first in one direction and then in the reverse direction, means for causing said shaft to remain motionless for a spaced period of time immediately preceding the change of direction of rotation of same, whereby the movement of the current in the upper portion of the water in the said tank, caused by the rotation of said paddles, may be thoroughly communicated to the lower portion of the water in the said tank, and a horizontal, perforate partition submerged in the water and lying beneath and in close proximity to the under side of said paddles and extending on all sides to within a spaced distance of the inner sides of said tank.

2. In a photo-print washing machine, consisting of a tank, having sides and bottom and open top, means for admitting water into said tank, means for discharging water from said tank, a perforate basket, with sides and bottom and open top and adapted to fit loosely within said tank, a perforate partition covering approximately the entire horizontal inside area of the said basket and adapted to be removably secured, in a submerged position, to and within said basket, a frame member mounted on the top of said tank, hinges on said frame member which allow it to be swung off the said tank, a vertical shaft mounted in a bearing in said frame member and adapted to oscillate in said bearing, a gear fixed on the upper end of said vertical shaft, a horizontal shaft mounted in bearings in said frame member, means for rotating said horizontal shaft continuously in one direction, pinions loosely mounted on said horizontal shaft and adapted to engage with and placed on opposite sides of said gear on said vertical shaft, paddles securely fixed to the lower end of the said vertical shaft and to be submerged in the water in the upper portion of said tank contiguous to and above the said perforate partition, and means for alternately and singly locking each of the said pinions to said horizontal shaft whereby movement in two different directions may be given the said gear on said vertical shaft, rotating said gear, alternately clock-wise and contra-clock-wise.

3. In a photo-print washing machine, the combination of a tank, means for receiving water into and discharging the same out of the said tank, a basket with perforate bottom and sides loosely and removably placed within said tank, a horizontal perforate partition submerged in the water in the upper portion of said tank and secured, removably, to the inside of said perforate basket, a frame member mounted on the top of said tank, hinged connections provided on one side of said frame member, a clamping connection on the opposite side of said frame member adapted to be quickly unclamped and allow the whole frame member, with the parts mounted thereon, to be swung out of operative position and from off the top of said tank, a horizontal shaft mounted in bearings on said frame, means for continuously rotating said horizontal shaft in one direction, a vertical shaft operating, centrally of said tank, in a bearing on said frame member, a gear fixed to the upper end of said vertical shaft, two pinions loosely mounted on said horizontal shaft, said pinions meshing with, and placed on opposite sides of the said gear on the said vertical shaft, a crank, means for rotating said crank, a connecting-rod, one end of which is pivoted over a pin in said crank, and having a slot in the opposite end thereof, an oscillating lever pivotally fixed at one end, a stud projecting out of said lever and adapted to enter and traverse the said slot in the said connecting-rod, a clutch collar slidably keyed to said horizontal shaft and adapted to be reciprocated by said lever along said shaft between the said two pinions, clutch pins projecting out from each side of said clutch, pins projecting out from the inner sides of each of the said pinions and adapted to engage singly and alternately with the adjacent pins in the sides of the said clutch collar, thereby causing said gear, while one pinion is engaged, to rotate in one direction, and upon the engagement of the other pinion, in the opposite direction, said slot in said connecting-rod offering means for a dwell in the oscillation of said lever at each reversal of direction of movement of said connecting-rod, paddles fixed on the lower end of the said vertical shaft, to be submerged in the water in the upper portion of the said tank and operating in close proximity, and above, the said horizontal perforate partitions, said paddles being of T shape in cross section, with the vertical leg depending, and the latter cut away for a spaced distance from the shaft, substantially as described.

FRANK W. SHOLES.